July 13, 1965
S. S. KAHN
3,193,921
METHODS OF SECURING TOGETHER WORKPIECES
UTILIZING BLIND FASTENERS
Filed April 6, 1961
2 Sheets-Sheet 1
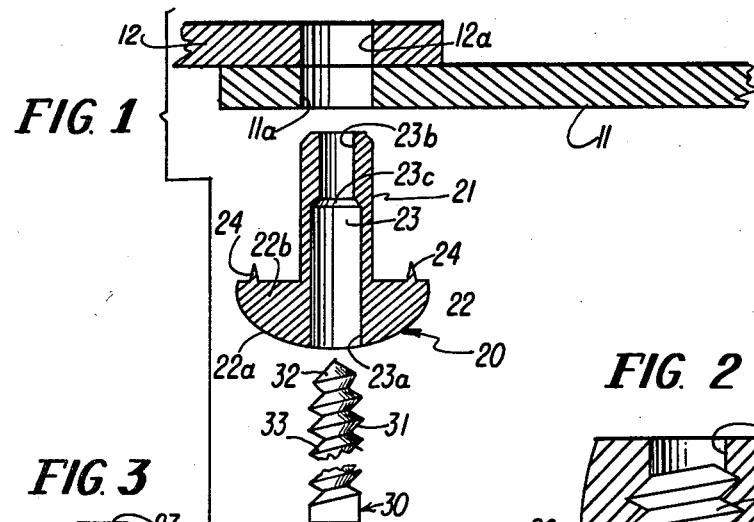
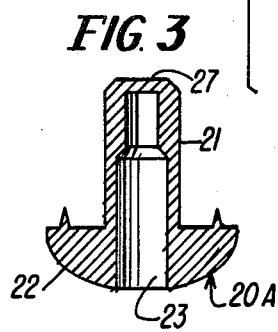
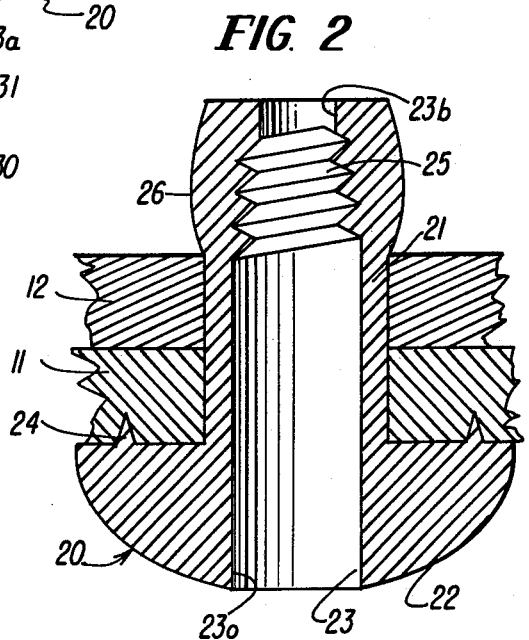
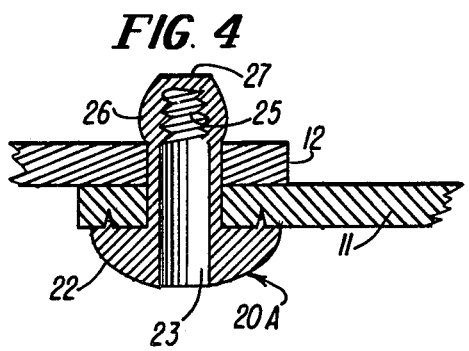
INVENTOR.
Simon S. Kahn
BY
ATTYS.

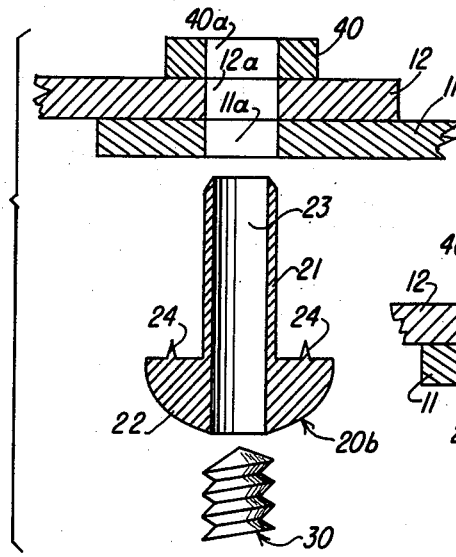
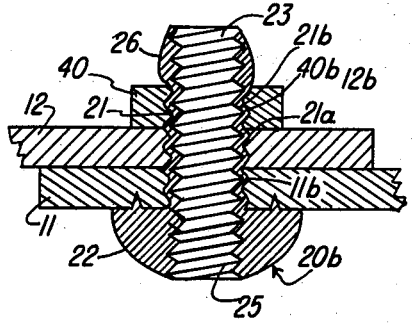
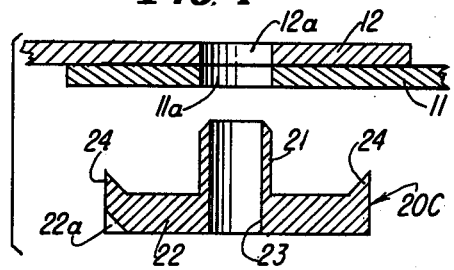
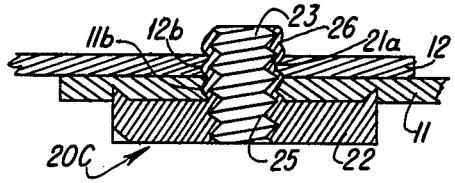
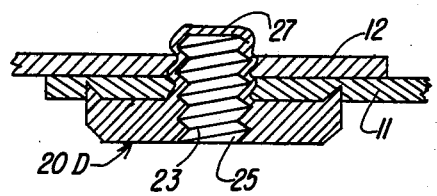
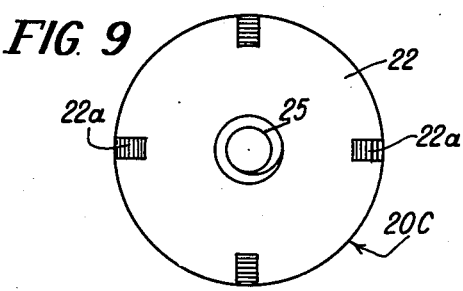
INVENTOR.
Simon S. Kahn

United States Patent Office 3,193,921
Patented July 13, 1965

3,193,921
METHODS OF SECURING TOGETHER WORK-PIECES UTILIZING BLIND FASTENERS
Simon S. Kahn, Glen Ridge, N.J., assignor to General American Transportation Corporation, Chicago, Ill., a corporation of New York
Filed Apr. 6, 1961, Ser. No. 101,173
4 Claims. (Cl. 29—509)

The present invention relates to methods of securing together workpieces utilizing blind fasteners.

It is a general object of the invention to provide an improved and simplified method of securing together a plurality of assembled workpieces utilizing a blind fastener that is set from the exterior employing a thread-swaging member.

Another object of the invention is to provide an improved and simplified method of producing a strong threaded anchorage in a workpiece utilizing a blind fastener that is set from the exterior employing a thread-swaging member.

A further object of the invention is to provide an improved method of setting a blind fastener with a thread-swaging member so as simultaneously to secure together with the blind fastener a plurality of cooperating workpieces and to form a strong internally threaded anchorage in the blind fastener that, in turn, is adapted further to receive the externally threaded shank of a screw, or the like.

Further features of the invention pertain to the particular arrangement of the steps of the method, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is an exploded plan view, partly in section, of a pair of workpieces that are adapted to be secured together by the associated blind fastener depicted, as well as a cooperating thread-swaging member that is employed in the present method in setting the blind fastener;

FIG. 2 is a greatly enlarged horizontal sectional view of the assembly of the workpieces and the blind fastener, after the setting of the blind fastener, employing the thread-swaging member;

FIG. 3 is a horizontal sectional view of a modified form of the blind fastener, as shown in FIGS. 1 and 2;

FIG. 4 is a horizontal sectional view of the assembly of the workpieces that is produced utilizing the blind fastener of FIG. 3;

FIG. 5 is an exploded plan view, partly in section, similar to FIG. 1, illustrating a modified form of the blind fastener and a cooperating swage nut employed therewith in producing an assembly;

FIG. 6 is a horizontal sectional view of the assembly that is produced utilizing the blind fastener and the swage nut of FIG. 5;

FIG. 7 is an exploded horizontal sectional view, similar to FIG. 5, illustrating another modified form of the blind fastener;

FIG. 8 is a horizontal sectional view of the assembly that is produced utilizing the blind fastener of FIG. 7;

FIG. 9 is a front view of the head of the blind fastener, as shown in FIGS. 7 and 8; and FIG. 10 is a horizontal sectional view, similar to FIG. 8, utilizing a further modified form of the blind fastener.

Referring now to FIG. 1, in accordance with the method embodying the features of the present invention, there are provided a plurality of workpieces 11 and 12 provided with a corresponding plurality of aligned holes 11a and 12a therein, the workpieces 11 and 12 being formed of a suitable material such, for example as steel; which workpieces 11 and 12 are to be secured together. Also, there is provided a blind fastener 20 that is formed of a suitable material such, for example as steel; which blind fastener 20 is to be utilized in the securing together of the workpieces 11 and 12. Further, there is provided an elongated thread-swaging member 30 that may be of the construction and arrangement of that disclosed in U.S. Reissue Patent No. 24,572, granted on December 2, 1958, to Donald P. Welles, Jr. More particularly, the thread-swaging member 30 comprises a fluteless thread-swaging tap that is formed of extremely hard material, such as hardened steel, and comprises a shank 31 terminating at a point 32 and carrying an external thread 33 upon the exterior surface thereof. As disclosed in the Welles patent mentioned, the external thread 33 is continuous along the exterior surface of the shank 31 and is formed of a series of successively radially relieved sectors circumferentially of the shank 31, the external thread 33 being substantially uniform in cross-section and of substantially equal depth taken in all planes intersecting the axis of the shank 31 longitudinally thereof, wherein the radially relieved sectors of the external thread 33 have gradually increasing outside and pitch and root diameters merging gradually into gradually decreasing outside and pitch and root diameters. More particularly, in this tap 30, three of the radially relieved sectors are provided about the circumference of the shank 31 and disposed in substantially equally angularly spaced-apart relation of approximately 120°.

The blind fastener 20 essentially comprises an elongated tubular shank 21 terminating at the outer end thereof in an enlarged head 22 and having an opening 23 extending from the exterior axially through the head 22 and through the shank 21, the opening 23 including an outer section 23a extending through the head 22 and into the outer portion of the shank 21 and an inner section 23b extending through the inner portion of the shank 21. In the arrangement, the outer section 23a of the opening 23 has a relatively large diameter that is only slightly larger than the major diameter of the external thread 33 provided on the shank 31 of the tap 30, while the inner section 23b of the opening 23 has a relatively small diameter that is only slightly smaller than the minor diameter of the external thread 33 provided on the shank 31 of the tap 30. The head 22 is of button-like form including a substantially semi-spherical outer surface 22a and a substantially flat inner work-engaging surface 22b, the surface 22b being substantially normal to the longitudinal axis of the shank 21. Fnially, the inner work-engaging surface 22b of the head 22 carries a plurality of inwardly projecting spurs 24 arranged in angularly spaced-apart relation, four of the spurs 24 being indicated.

In accordance with the present method, the workpieces 11 and 12 are assembled in overlapped relation with the holes 11a and 12a therein arranged in alignment with each other, and then the shank 21 of the blind fastener 20 is inserted inwardly from the exterior through the aligned holes 11a and 12a, so that the spurs 24 carried by the head 22 engage the adjacent outer surface of the outermost workpiece 11. The head 22 of the blind fastener 20 is then struck a sharp blow from the exterior in order to cause the spurs 24 to embed themselves into the outermost workpiece 11 and so that the work-engaging surface 22b is driven into engagement with the outer surface of the outermost workpiece 11. At this time, the inner end of the shank 21 projects through the hole 12a provided in the innermost workpiece 12 and is thus disposed inwardly of the adjacent innermost workpiece 12;

whereby an assembly is produced of the workpieces 11 and 12 and the blind fastener 20.

The lead end 32 of the tap 30 is then inserted from the exterior into the outer end of the opening 23 and thence through the enlarged section 23a thereof into engagement with the shoulder 23c disposed between the sections 23a and 23b of the opening 23. The tap 30 is then pressed home and rotated in the usual manner, whereby the external thread provided upon the shank 31 thereof subjects the interior surface of the shank 21 to swaging pressure internally of the opening 23b therein, thereby to swage a corresponding internal thread 25 upon the inner end of the shank 21 of the blind fastener 20, as shown in FIG. 2. This operation of the tap 30 subjecting the inner end of the shank 21 to swaging pressure interiorly of the reduced section 23b of the opening 23 expands the same to produce a bulbous enlargement 26 upon the inner end of the shank 21 disposed inwardly of the adjacent innermost of the workpieces 12 and in frictional engagement therewith, as clearly shown in FIG. 2.

Accordingly, it will be understood that the mere operation of the tap 30 simultaneously produces the internal thread 25 upon the inner end of the shank 21 and the enlargement 26. Of course, the assembled workpieces 11 and 12 are securely clamped together between the head 22 and the enlargement 26 carried by the blind fastener 20. Furthermore, the internal thread 25 is adapted to receive a cooperating external thread provided upon the shank of a screw, or the like, thereby accommodating the securing to the assembly of FIG. 2 still another part, not shown.

In swaging the internal thread 25 upon the inner end of the shank 21, the same may extend only partially through the reduced section 23b of the opening 23, or entirely therethrough, depending upon the extent of operation of the tap 30, as will be readily apparent.

Referring now to FIGS. 3 and 4, the modified form of the blind fastener 20A there illustrated is substantially identical to the blind fastener 20 described in conjunction with FIGS. 1 and 2, except that in this form thereof the extreme inner end of the opening 23 is closed by an end wall 27.

Of course, this form of the blind fastener 20A is set employing the tap 30, in the manner previously explained, so as to form the enlargement 26 upon the inner end of the shank 21 and as shown in FIG. 4. Accordingly, in this construction, the end wall 27 closes the end of the enlargement 26 and thus the inner end of the opening 23 so as to render the composite construction leak-proof in the event the workpieces 11 and 12 that are secured together comprise the plates of a composite tank, or the like.

Referring now to FIG. 5, another modified form of the fastener arrangement is illustrated that comprises, in addition to the blind fastener 20B of modified form, a swage nut 40. In this arrangement, the blind fastener 20B comprises the elongated tubular shank 21 terminating at the outer end thereof in the enlarged head 22 carrying the spurs 24, as previously described. However, in this construction of the blind fastener 20B, the opening 23 that is provided through the head 22 and through the shank 21 may be of one diameter, as illustrated. The swage nut 40 comprises a substantially annular body formed of a suitable material, such, for example, as steel, and having a centrally disposed hole 40a therein, corresponding in diameter to the holes 12A and 11A respectively provided in the workpieces 12 and 11. In this case, after the shank 21 of the blind fastener 20B has been inserted through the aligned holes 11a and 12a respectively provided in the workpieces 11 and 12 and the head 22 has been struck from the exterior to set the spurs 24, the swage nut 40 is placed upon the inner end of the shank 21 and pressed in place against the adjacent surface of the innermost workpieces 12. Accordingly, in this assembly, the head is disposed in engagement with the adjacent surface of the outermost of the workpieces 11, the workpieces 11 and 12 surround the outer portion of the shank 21, the swage nut 40 surrounds the intermediate portion of the shank 21, and the inner portion of the shank 21 projects inwardly with respect to the adjacent surface of the swage nut 40.

Again the blind fastener 20B is set, employing the tap 30, in the manner previously explained; whereby the internal thread 25, in this case, extends through the head 22 and completely through the shank 21 so that the enlargement 26 is formed inwardly of the adjacent swage nut 40, with the result that the workpieces 11 and 12, together with the swage nut 40, are securely clamped between the head 22 and the enlargement 26, as shown in FIG. 6.

More particularly, in this case, when the tap 30 subjects the interior surface of the shank 21 to swaging pressure in producing the internal thread 25, as previously explained, the outer portion of the shank 21 is coined between the external thread 33 carried by the shank 31 of the tap 30 and the two workpieces 11 and 12, and the intermediate portion of the shank 21 is coined between the external thread 33 carried by the shank 31 of the tap 30 and the swage nut 40. Consequently, an external thread-like structure 21a is formed upon the exterior surface of the outer portion of the shank 21 and cooperating internal thread-like structures 11b and 12b are formed upon the respective workpieces 11 and 12 interiorly of the respective holes 11a and 12a therein; which external thread-like structure 21a is complementary to the internal thread-like structures 11b and 12b, frictionally engaging the same, so as securely to anchor the respective workpieces 11 and 12 upon the outer portion of the shank 21 of the blind fastener 20B. Similarly, an external thread-like structure 21b is formed upon the exterior surface of the intermediate portion of the shank 21 and a cooperating internal thread-like structure 40b is formed upon the swage nut 40 interiorly of the hole 40a therein; which external thread-like structure 21b is complementary to the internal thread-like structure 40b, frictionally engaging the same, so as securely to anchor the swage nut 40 upon the intermediate portion of the shank 21 of the blind fastener 20B. Of course, the inner end of the shank 21 is unsupported so that the swaging of the internal thread 25 therein is productive of the enlargement 26 upon the inner end of the shank 21 and in engagement with the adjacent surface of the swage nut 40, as previously explained. Further, it is pointed out that the external thread-like structure 21a carried by the outer portion of the shank 21 and the external thread-like structure 21b carried by the intermediate portion of the shank 21 are continuous with each other; and likewise, the internal thread-like structures 11b, 12b and 21b respectively carried by the workpieces 11 and 12 and by the swage nut 40 are continuous with each other, with the result that the elements 11, 12 and 40 are securely retained in stacked relation between the head 22 and the enlargement 26 of the blind fastener 20B. Finally, it is pointed out that the composite external thread-like structures 21a, 21b has the same pitch as the composite internal thread-like structures 11b, 12b and 40b; whereby these two composite thread-like structures are in phase with each other; which arrangement necessarily follows by virtue of the fact that the thread-like structures mentioned are formed as a consequence of the swaging pressure that is exerted by the external thread 33 carried by the shank 31 of the tap 30 incident to the operation of the tap 30 from the exterior and in the opening 23 provided in the shank 21 of the blind fastener 20B. Of course, it will be understood that the internal thread 25 in the blind fastener 20B is adapted to receive and to engage the threaded shank of a screw, or the like, for the purpose of securing to the assembly another part, not shown, as previously explained.

Also, it will be understood that a modified form of the blind fastener 20B may be provided in which the end wall, not shown, is provided in the extreme inner end of the shank 21 in closing relation with respect to the opening 23; which modified form of the blind fastener 20B would be of particular utility in the event that the workpieces 11 and 12 comprise the plates of a tank, or the like, wherein it is desirable that the assembly, including the blind fastener 20B, be liquid-tight.

Referring now to FIGS. 7 to 9, inclusive, a further modified form of the fastener arrangement is illustrated that comprises a modified construction of the blind fastener 20C. More particularly, the blind fastener 20C comprises the tubular shank 21 terminating in the enlarged head 22 and having the opening 23 extending from the exterior auxiliary through the head 22 and through the shank 21, the head 22 being of disk-like configuration. In the outer surface of the head 22, four angularly spaced-apart depressions 22a are struck to form the four corresponding spurs 24, as best illustrated in FIGS. 7 and 8. In the blind fastener 20C, the shank 21 is substantially identical to the shank 21 in the blind fastener 20B, as previously described, except that it is somewhat shorter in length as it is contemplated that the blind fastener 20C will be utilized directly in securing together the assembled workpieces 11 and 12, without the utilization of the cooperating swage nut.

In accordance with this modification of the method, the shank 21 of the blind fastener 20C is inserted inwardly through the aligned holes 11a and 12a respectively provided in the assembled workpieces 11 and 12; the head 22 is then struck to set the spurs 24; and then the tap 30 is employed for the purpose of swaging the internal thread 25 within the opening 23 provided through the head 22 and through the shank 21; whereby the inner end of the shank 21 is expanded to produce the enlargement 26 disposed inwardly with respect to the adjacent innermost workpiece 12, all in the manner previously described. In this case, the internal thread 25 extends completely through the shank 21; and again the swaging pressure that is exerted upon the outer portion of the tubular shank 21 effects the swaging of the external thread-like structures 21a upon the exterior surface of the shank 21 and the cooperating complementary internal thread-like structures 11b and 12b upon the respective workpieces 11 and 12, for the purpose previously described. Of course, in this case, the workpieces 11 and 12 are clamped together in assembled relation between the head 22 and the enlargement 26 and are also retained in place upon the shank 21 by virtue of the cooperation of the external thread-like structure 21a, with the two internal thread-like structures 11b and 12b, as previously explained. Furthermore, the internal thread 25 is adapted to receive the external thread provided upon the shank of a screw, or the like, for the purpose of securing to the assembly still another part, not shown.

Referring now to FIG. 10, a still further modified form of the arrangement is illustrated that comprises another modified form of the blind fastener 20D; which blind fastener 20D is identical to the blind fastener 20C, as previously described in conjunction with FIGS. 7 to 9, inclusive, except that the extreme inner end of the shank 21 of the blind fastener 20D is provided with an end wall 27 closing the end of the opening 23 and terminating slightly inwardly of the inner end of the internal thread 25. As previously explained, the blind fastener 20D is especially useful in producing the assembly of FIG. 10, wherein the workpieces 11 and 12 comprise the plates of a tank, or the like.

In view of the foregoing, it will be understood that in each of the blind fasteners 20, 20A, 20B, 20C and 20D, the same may be set entirely from the exterior employing the thread-swaging tap 30 so as securely to fasten together the assembled workpieces 11 and 12, in the general manner of a blind rivet. However, incident to the setting of these blind fasteners, the internal threads 25 are formed in the shanks thereof, that are adapted to receive and to engage the external threads provided on the shanks of screws, or the like, whereby still other parts, not shown, may be readily secured to these completed assemblies.

Furthermore, in the blind fasteners 20B, 20C and 20D, the setting thereof further produces the external thread-like structure 21a upon the outer surface of the shank 21, as well as the internal thread-like structures 11b and 12b in the respective workpieces 11 and 12 within the respective holes 11a and 12a therein; which external thread-like structure 21a is disposed in frictional engagement with the complementary internal thread-like structures 11b and 12b. Further, in the blind fastener 20B, the setting thereof produces the external thread-like structure 21b upon the outer surface of the shank 21, as well as the internal thread-like structure 40b in the swage unit 40 within the hole 40a provided therein. Finally, in the blind fasteners 20B, 20C and 20D, the internal thread 25 is of the same pitch as the thread-like structures 21a, etc., and the thread-like structures 11b, 12b, etc. and is also in phase therewith, since both the internal thread 25 and all of the thread-like structures mentioned are formed simultaneously by the mere operation of the thread-swaging tap 30.

In connection with the utilization of the blind fasteners 20, 20A, 20B, 20C and 20D, it will be understood that strong threaded anchorages may be produced therewith in a single workpiece, wherein there is not involved the securing together of a plurality of individual workpieces. This arrangement is particularly advantageous, wherein the workpiece comprises a single sheet of relatively thin sheet metal.

In view of the foregoing, it is apparent that there has been provided an improved method of making an assembly of a plurality of workpieces and a blind fastener that not only secures together the workpieces mentioned, but that also provides a strong anchorage for the reception of the threaded shank of a screw, or the like, so as to accommodate the securing to the assembly of still another part.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of securing together a plurality of assembled workpieces formed of relatively soft metal and provided with a corresponding plurality of aligned holes therethrough, comprising providing a fastener formed of relatively hard metal and including an elongated tubular shank terminating at the outer end thereof in an enlarged head and having an opening extending from the exterior axially through said head and into said shank, inserting said shank through said aligned holes in said assembled workpieces and with said head in frictional engagement with the adjacent outermost of said assembled workpieces and with the inner end of said shank disposed inwardly of the adjacent innermost of said assembled workpieces, inserting an elongated thread-swaging member formed of extremely hard metal from the exterior into the outer end of said opening, operating said thread-swaging member from the exterior to subject the interior surface of said shank to swaging pressure so as to swage an internal thread in said shank interiorly of said opening, said subjecting of the internal surface of the outer portion of said shank to swaging pressure also simultaneously swaging an external thread-like structure upon the exterior surface of the outer portion of said shank and swaging an internal thread-like structure in said workpieces interiorly of said holes therein, wherein said thread-like structures are complementary and disposed in interlocked frictional engagement with each other so as securely to anchor said assembled workpieces in place upon the outer portion of said shank, said subjecting of the internal surface of the inner portion of said shank to swaging pressure also simultaneously expanding the same to produce an enlargement thereupon disposed inwardly of the adjacent innermost of said assembled workpieces and in frictional engagement therewith, and then disengaging said thread-swaging member from said internal thread and removing the same from said opening back to the exterior so that said opening is unobstructed, whereby said plurality of assembled workpieces are securely clamped together between said head and said enlargement and independently of said thread-swaging member, and whereby said unobstructed opening is adapted removably to receive the shank of a screw, or the like, carrying thereupon an external thread and with the external thread in cooperating engagement with said internal thread.

2. The method of securing together a plurality of assembled workpieces formed of relatively soft metal and provided with a corresponding plurality of aligned holes therethrough, comprising providing a fastener formed of relatively hard metal and including an elongated tubular shank terminating at the outer end thereof in an enlarged head and having an opening extending from the exterior axially through said head and into said shank, inserting said shank through said aligned holes in said assembled workpieces and with said head in frictional engagement with the adjacent outermost of said assembled workpieces and with the intermediate portion of said shank disposed inwardly of the adjacent innermost of said assembled workpieces, providing a nut formed of relatively soft metal and having an aperture therethrough, placing said nut upon the intermediate portion of said shank and in engagement with the innermost of said assembled workpieces, inserting an elongated thread-swaging member formed of extremely hard metal from the exterior into the outer end of said opening, operating said thread-swaging member from the exterior to subject the interior surface of said shank to swaging pressure so as to swage an internal thread in said shank interiorly of said opening, said subjecting of the internal surface of the outer portion of said shank to swaging pressure also simultaneously swaging a first external thread-like structure upon the exterior surface of the outer portion of said shank and swaging a first internal thread-like structure in said workpieces interiorly of said holes therein, wherein said first thread-like structures are complementary and disposed in interlocked frictional engagement with each other so as securely to anchor said assembled workpieces in place upon the outer portion of said shank, said subjecting of the internal surface of the intermediate portion of said shank to swaging pressure also simultaneously swaging a second external thread-like structure upon the exterior surface of the intermediate portion of said shank and swaging a second internal thread-like structure in said nut interiorly of said aperture therein, wherein said second thread-like structures are complementary and disposed in interlocked frictional engagement with each other so as securely to anchor said nut in place upon the intermediate portion of said shank, said subjecting of the internal surface of the inner portion of said shank to swaging pressure also simultaneously expanding the same to produce an enlargement thereupon disposed inwardly of the adjacent inner surface of said nut and in frictional engagement therewith, and then disengaging said thread-swaging member from said internal thread and removing the same from said opening back to the exterior so that said opening is unobstructed, whereby said plurality of assembled workpieces and said nut are securely clamped together between said head and said enlargement and independently of said thread-swaging member, and whereby said unobstructed opening is adapted removably to receive the shank of a screw, or the like, carrying thereupon an external thread and with the external thread in cooperative engagement with said internal thread.

3. The method of producing a strong threaded anchorage in a workpiece formed of relatively soft metal and provided with a hole therethrough, comprising providing a fastener formed of relatively hard metal and including an elongated shank terminating at the outer end thereof in an enlarged head and having an opening extending from the exterior axially through said head and into said shank, inserting said shank through said hole in said workpiece and with said head in frictional engagement with the adjacent outer surface of said workpiece and with the inner end of said shank disposed inwardly of the adjacent inner surface of said workpiece, inserting an elongated thread-swaging member formed of extremely hard metal from the exterior into the outer end of said opening, operating said thread-swaging member from the exterior to subject the interior surface of said shank to swaging pressure so as to swage an internal thread in said shank interiorly of said opening, said subjecting of the internal surface of the outer portion of said shank to swaging pressure also simultaneously swaging an external thread-like structure upon the exterior surface of the outer portion of said shank and swaging an internal thread-like structure in said workpiece interiorly of said hole therein, wherein said thread-like structures are complementary and disposed in interlocked frictional engagement with each other so as securely to anchor said workpiece in place upon the outer portion of said shank, said subjecting of the internal surface of the inner portion of said shank to swaging pressure also simultaneously expanding the same to produce an enlargement thereupon disposed inwardly of the adjacent inner surface of said workpiece and in frictional engagement therewith, and then disengaging said thread-swaging member from said internal thread and removing the same from said opening back to the exterior so that said opening is unobstructed, whereby said workpiece is securely clamped between said head and said enlargement and independently of said thread-swaging member, and whereby said unobstructed opening is adapted removably to receive the shank of a screw, or the like, carrying thereupon an external thread and with the external thread in cooperative engagement with said internal thread.

4. The method of producing a strong threaded anchorage in a workpiece formed of relatively soft metal and provided with a hole therethrough, comprising providing a fastener formed of relatively hard metal and including an elongated shank terminating at the outer end thereof in an enlarged head and having an opening extending from the exterior axially through said head and into said shank, inserting said shank through said hole in said workpiece and with said head in frictional engagement with the adjacent outer surface of said workpiece and with the intermediate portion of said shank disposed inwardly of the adjacent inner surface of said workpiece, providing a nut formed of relatively soft metal and having an aperture therethrough, placing said nut upon the intermediate portion of said shank and in engagement with the inner surface of said workpiece, inserting an elongated thread-swaging member formed of extremely hard metal from the exterior into the outer end of said opening, operating said thread-swaging member from the exterior to subject the inner surface of said shank to swaging pressure so as to swage an internal thread in said shank interiorly of said opening, said subjecting of the internal surface of the outer portion of said shank to swaging pressure also simultaneously swaging a first external thread-like structure upon the exterior surface of the outer portion of said shank and swaging a first internal thread-like structure in said workpiece interiorly of said hole therein, wherein said first thread-like structures are complementary and disposed in interlocked frictional engagement with each other so as securely to anchor said workpiece in place upon the outer portion of said shank, said subjecting of the internal surface of the intermediate portion of said shank to swaging pressure also simultaneously swaging a second external thread-like structure upon the exterior surface of the outer portion of said shank and swaging a second internal thread-like structure in said nut interiorly of an aperture therein, wherein said second thread-like structures are complementary and disposed in interlocked frictional engagement with each other so as securely to anchor said nut in place upon the intermediate portion of said shank, said subjecting of the internal surface of the inner portion of said shank to swaging pressure also simultaneously expanding the same to produce an enlargement thereupon disposed inwardly of the adjacent inner surface of said nut and in frictional engagement therewith, and then disengaging said thread-swaging member from said internal thread and removing the same from said opening back to the exterior so that said opening is unobstructed, whereby said workpiece and said nut are securely clamped together between said head and said enlargement and independently of said thread-swaging member, and whereby said unobstructed opening is adapted removably to receive the shank of a screw, or the like, carrying thereupon an external thread and with the external thread in cooperative engagement with said internal thread.

References Cited by the Examiner

UNITED STATES PATENTS

| | | | |
|---|---|---|---|
| 669,965 | 3/01 | Jamison. | |
| 1,570,234 | 1/26 | Feldmar. | |
| 1,784,755 | 12/30 | Rosenberg | 85—40 |
| 2,185,939 | 1/40 | Deshon et al. | 218—29 X |
| 2,348,589 | 5/44 | Auten | 85—2.4 |
| 2,383,623 | 8/45 | Spicer | 218—29 |
| 2,640,618 | 6/53 | Hale | 218—29 |
| 2,709,848 | 6/55 | Chatfield | 29—526 |
| 3,030,705 | 4/62 | Gill | 29—526 |

FOREIGN PATENTS

| | | |
|---|---|---|
| 306,925 | 5/29 | Great Britain. |
| 544,257 | 10/40 | Great Britain. |
| 845,205 | 8/60 | Great Britain. |

WHITMORE A. WILTZ, *Primary Examiner.*

CARL W. TOMLIN, JOHN F. CAMPBELL, *Examiners.*